United States Patent
Nah

Patent Number: 5,673,088
Date of Patent: Sep. 30, 1997

[54] MULTI-BROADCAST SELECTION APPARATUS

[75] Inventor: Il-koo Nah, Kwangmyung, Rep. of Korea

[73] Assignee: Samsung Electronics Co., Ltd., Kyungki-Do, Rep. of Korea

[21] Appl. No.: 565,127

[22] Filed: Nov. 30, 1995

[30] Foreign Application Priority Data

Nov. 30, 1994 [KR] Rep. of Korea .................. 94-32214

[51] Int. Cl.⁶ .................................................. H04N 5/46
[52] U.S. Cl. .................. 348/555; 348/557; 348/728; 348/736; 348/738
[58] Field of Search ........................ 348/555, 557, 348/725, 728, 731, 732, 733, 736, 738; H04N 5/46, 5/44, 5/455, 5/60

[56] References Cited

U.S. PATENT DOCUMENTS

| | | | |
|---|---|---|---|
| 4,868,892 | 9/1989 | Tults | 348/732 |
| 5,083,205 | 1/1992 | Arai | 348/555 |

*Primary Examiner*—Sherrie Hsia
*Attorney, Agent, or Firm*—Sughrue, Mion, Zinn, Macpeak & Seas

[57] ABSTRACT

A channel selection apparatus is provided for allowing receipt of signals broadcast according to the NTSC, SECAM and PAL broadcast modes. A controller discriminates the signal's broadcast mode based on the horizontal sync signal included in the received signal and alters a circuit connection path. Accordingly, a desired broadcast mode can be automatically selected without requiring any particular switch manipulation by a user. Further, a video signal processing path is separated from a sound signal processing path, in order to obtain excellent sound quality, even when receiving a stereo broadcast. Also, it is possible to easily automate the manufacturing process for the apparatus, thereby improving productivity.

23 Claims, 5 Drawing Sheets

FIG. 5
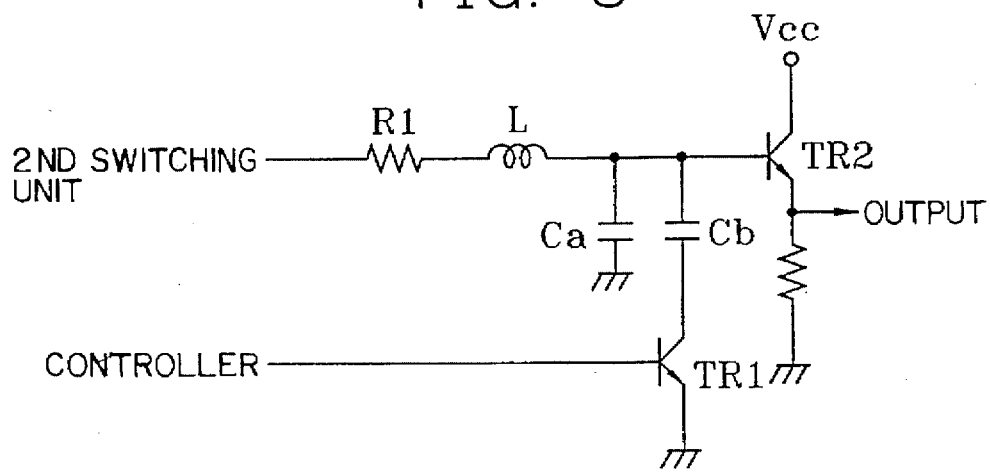
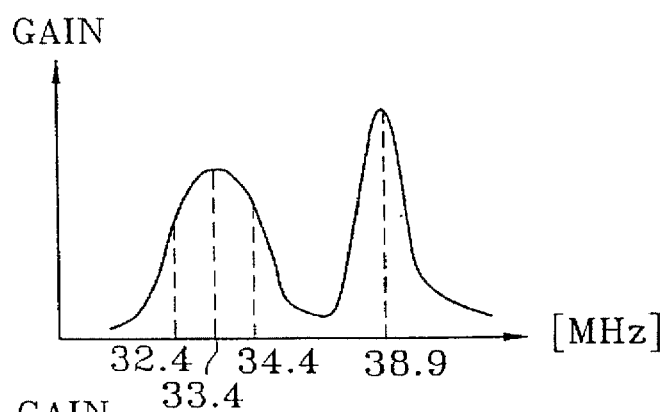
FIG. 6A
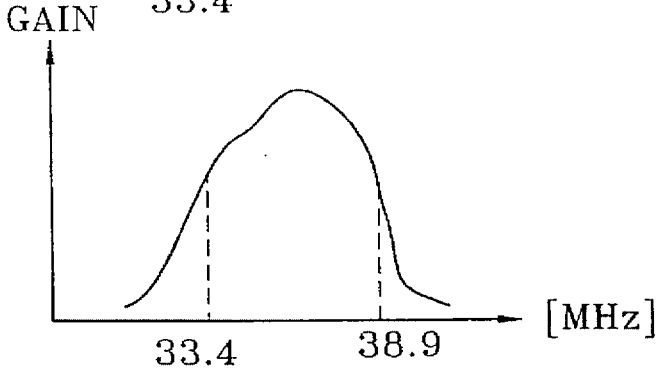
FIG. 6B
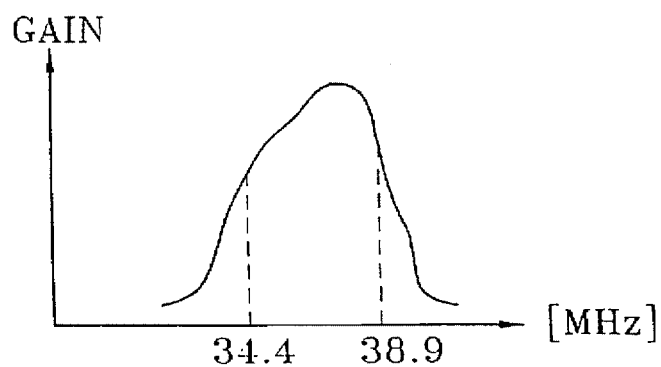
FIG. 6C

MULTI-BROADCAST SELECTION APPARATUS

BACKGROUND OF THE INVENTION

1. Field of the Invention

The present invention relates to a channel selection apparatus for receiving broadcasting signals such as those transmitted according to NTSC, SECAM and PAL broadcasting modes. More particularly, it relates to a multi-broadcast channel selection apparatus for discriminating a horizontal sync signal among video signal components received by a receiver apparatus, and receiving each type of broadcast signal.

2. Description of Related Art

Currently commercialized broadcast signals are generally classified as signals following one of NTSC, PAL and SECAM broadcast modes, according to a bandwidth per channel and a carrier adapted therein, respectively. These three broadcast modes provide for an excellent image in which it is difficult for a user to visually distinguish a picture produced from one type of signal from that produced from another type of signal. Each broadcast mode has its own inherent merits.

FIGS. 1A through 1D show frequency spectra which are adapted to the respective broadcast modes. Here, $f_p$ represents a video frequency, $f_c$ represents a chrominance frequency, and $f_s$ represents a sound frequency. FIG. 1A corresponds the NTSC mode, FIG. 1B corresponds to the PAL-B mode and the portion represented as a dotted line on the left-hand side of FIG. 1B corresponds to the PAL-G mode, FIG. 1C corresponds to the PAL-I mode, and FIG. 1D corresponds to both the PAL-D and PAL-K modes.

Thus, to receive signals of these respective broadcast modes, the bandwidth per channel and the carriers should be taken into consideration. An example of a receiver for receiving signals according to these different broadcast modes is shown in FIG. 2.

FIG. 2 is a block diagram showing a conventional channel selection apparatus for receiving multi-broadcast signals. As shown in FIG. 2, the conventional channel selection apparatus includes a receiving antenna 1 and a tuner 2 to receive a modulated broadcast signal.

In FIG. 2, tuner 2 selects a desired channel from among a number of channel frequencies having signals broadcast thereon, which are received via receiving antenna 1, and attenuates the selected signal to an appropriate level to facilitate signal processing. Then, tuner 2 frequency-converts the attenuated signal to an intermediate frequency (IF). In the conversion, a modulated signal transmitted on the selected channel is not converted, but rather is simply shifted to a lower frequency. An amplifier 3 connected to an output end of tuner 2 amplifies the converted IF as necessary to compensate for power loss due to an in-line surface acoustic wave (SAW) filter 6, which is described later. A first trap unit 4, which is connected between tuner 2 and amplifier 3, operates only when a signal is received which is broadcast in the NTSC mode. Operation of the first trap unit 4 depends on a switching operation and it receives the NTSC mode signal only while switch 5 is turned on by a control signal compulsorily output by a user. An operational characteristic of first trap 4 is shown in FIG. 3.

FIG. 3 shows a gain-limited frequency spectrum according to the first trap unit. As shown in FIG. 3, it can be seen that frequency components of 32.4 MHz and 34.4 MHz are trapped. The reason why the 32.4 MHz component is trapped is for reducing influence on adjacent channels, since the bandwidth per channel of the NTSC mode is 6 MHz. The reason why the 34.4 MHz component corresponding to a sound intermediate frequency (SIF) of the NTSC mode is trapped, is for suppressing an excessive color frequency ($f_c$) of 3.58 MHz during demodulation. Meanwhile, when the broadcast signal is not broadcast in the NTSC mode, switch 5 is turned off, so that the IF output from tuner 2 is applied directly to amplifier 3.

Once the signal amplified by amplifier 3 is applied to SAW filter 6, SAW filter 6 filters a particular band by using a wide-type filter through which signal bands related to the respective broadcast modes can pass. This is performed to prevent interference from sound signals among the amplified signals. Then, a detector 7 demodulates the received modulated signal and regenerates the original signal from the transmitter end. Detector 7 uses a sync detection method which generates a demodulated signal by multiplying the received signal by a carrier signal. Here, in the case of an intercarrier method, both a video signal and a sound signal are detected. To separately extract the video and sound signals, the output of detector 7 is connected to a second trap unit 8 and a first band-pass-filter (BPF) unit 9. Second trap unit 8 removes a sound signal component from the detected signals, thereby extracting only a video signal component. Second trap unit 8 includes first through fourth trap circuits for trapping frequency components of 4.5 MHz, 5.5 MHz, 6.0 MHz and 6.5 MHz, respectively. For example, when an NTSC signal is received, the first trap circuit traps a sound signal of 4.5 MHz to extract only a video signal. Likewise, when other types of broadcast signals are received, the second through fourth trap circuits operate selectively so that only the necessary video signal is extracted.

Meanwhile, first BPF unit 9 uses BPFs to extract only an FM sound signal from among the detected signals output from detector 7. BPF unit 9 includes first through fourth BPFS, in which FM sound signals corresponding to frequency components of 4.5 MHz, 5.5 MHz, 6.0 MHz and 6.5 MHz, which correspond to the respective broadcasting modes, are band-pass-filtered. A mixer 10 which is connected to the outputs of each of the first through fourth BPFs, receives the band-pass-filtered FM sound signal and an oscillation signal having a frequency of 500 KHz output from an oscillator 11 and mixes the received signals. Next, if a second BPF unit 12 passes only the 5.5 MHz component of the mixed signal, a detector 13 performs FM detection and outputs the FM detected sound signal.

The above-described conventional channel selection apparatus can receive the NTSC broadcast signal as well as the other types of broadcast signals. However, when the NTSC signal is received, a user should not manipulate only a switching unit 5 so that first trap unit 4 operates, but should also check whether first trap unit 4 exactly traps the 32.4 MHz and 34.4 MHz components of the received signal as it was set to do in the manufacturing process. Moreover, when such a trap adjustment does not match exactly because of technical difficulties, a poor image cannot but be obtained even though the NTSC signal is obtained. Finally, the conventional channel selection apparatus does not faithfully receive the respective broadcast signals.

Also, in the above-described conventional channel selection apparatus, due to the sensitivity of a sound signal passing through mixer 10, a difference is generated according to each broadcast mode upon detection of the sound signal, and the quality of the sound is severely degenerated for a stereo broadcast which uses a plurality of carriers.

SUMMARY OF THE INVENTION

Therefore, it is an object of the present invention to provide a multi-broadcast channel selection apparatus which can simply select a desired broadcast channel and recover a high-quality version of the signal broadcast on the selected channel.

To accomplish the above object of the present invention, there is provided a multi-broadcast channel selection apparatus having a tuner for receiving a modulated signal broadcast according to a plurality of broadcast modes from a transmitter and converting the received signal into an intermediate frequency (IF) signal having video and sound portions, wherein the video portion includes a sync signal, the multi-broadcast channel selection apparatus comprising:

- a video signal processing circuit, coupled to an output of said tuner, for demodulating the video portion of the IF signal, and outputting a video signal adapted for each of the plurality of broadcast modes;
- a sound signal processing circuit, coupled to said output of said tuner separately from said video signal processing circuit, for demodulating a sound portion of the IF signal, and outputting a sound signal adapted for each of the plurality of broadcast modes;
- a sync signal detector, coupled to an output of said video signal processing circuit, for detecting the sync signal among of the video portion of the IF signal; and
- a controller, coupled to an output of said sync signal detector, for receiving the sync signal and to determining the broadcast mode of the video signal output from said video signal processing circuit, and outputting a control signal to said video and sound signal processing circuits according to the determined result.

BRIEF DESCRIPTION OF THE DRAWINGS

The preferred embodiments are described with reference to the attached drawings, wherein:

FIG. 5 is a detailed circuit diagram of a color signal detector employed in the present invention;

FIGS. 6A represents a filter characteristic of a third surface acoustic filter employed in the present invention;

FIGS. 6B represents a filter characteristic of a first surface acoustic filter employed in the present invention;

FIGS. 6C represents a filter characteristic of a second surface acoustic filter employed in the present invention;

DETAILED DESCRIPTION OF THE PREFERRED EMBODIMENT

A preferred embodiment of the present invention is described below in more detail with reference to the accompanying drawings.

Figure 1A:
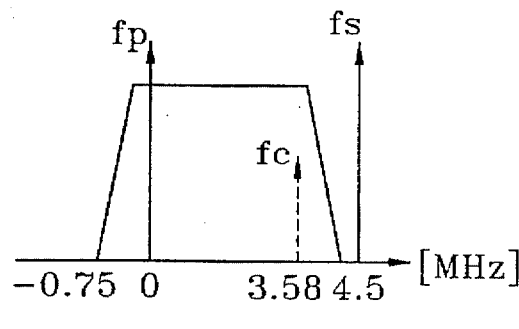
FIGS. 1A through 1D show frequency spectra which correspond to various broadcast modes.
Figure 1B:
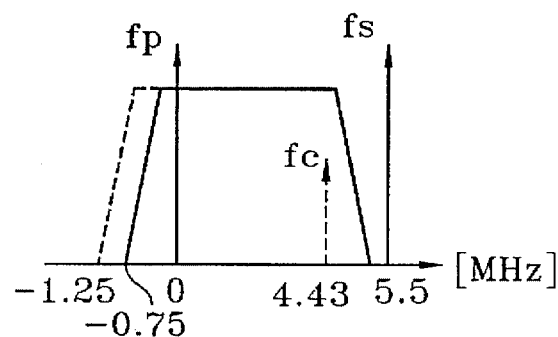
Figure 1C:
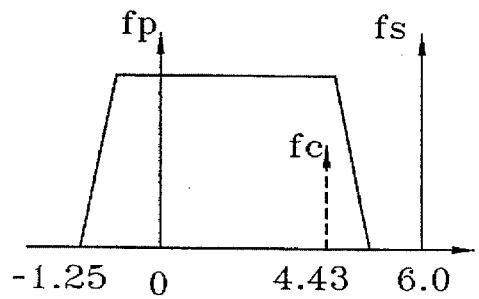
Figure 1D:
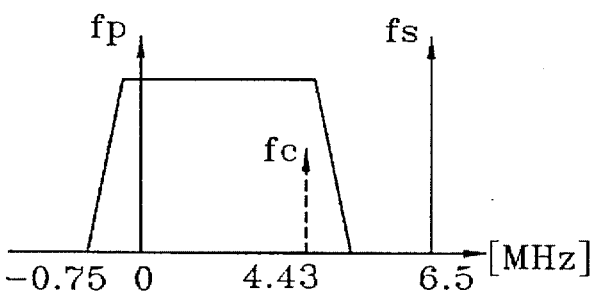
Figure 3:
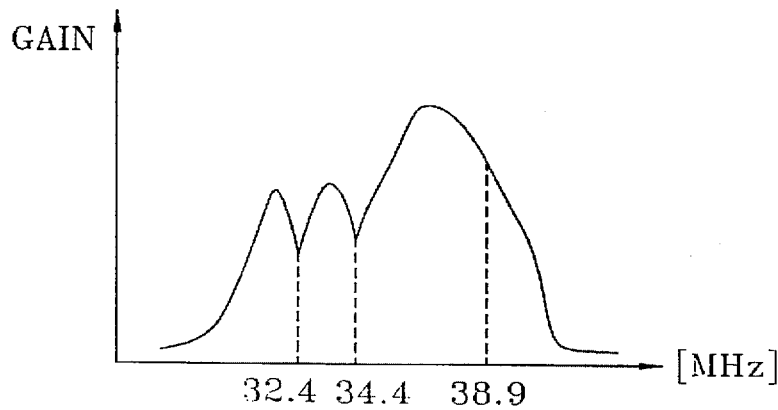
FIG. 3 is a graph showing a gain-limited frequency spectrum for a conventional first trap unit.
Figure 2:
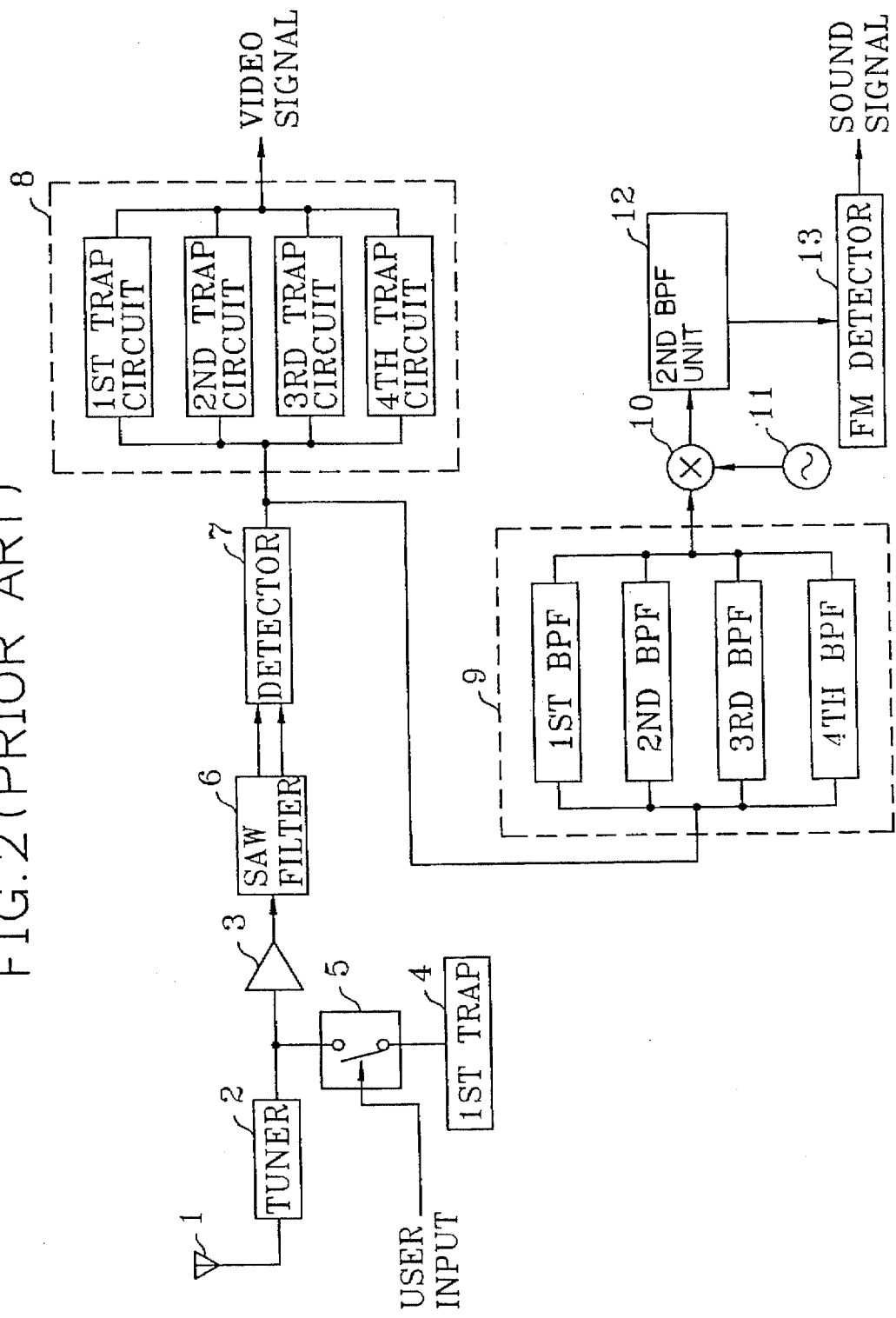
FIG. 2 is a block diagram of a conventional multi-broadcast channel selection apparatus.
Figure 4:
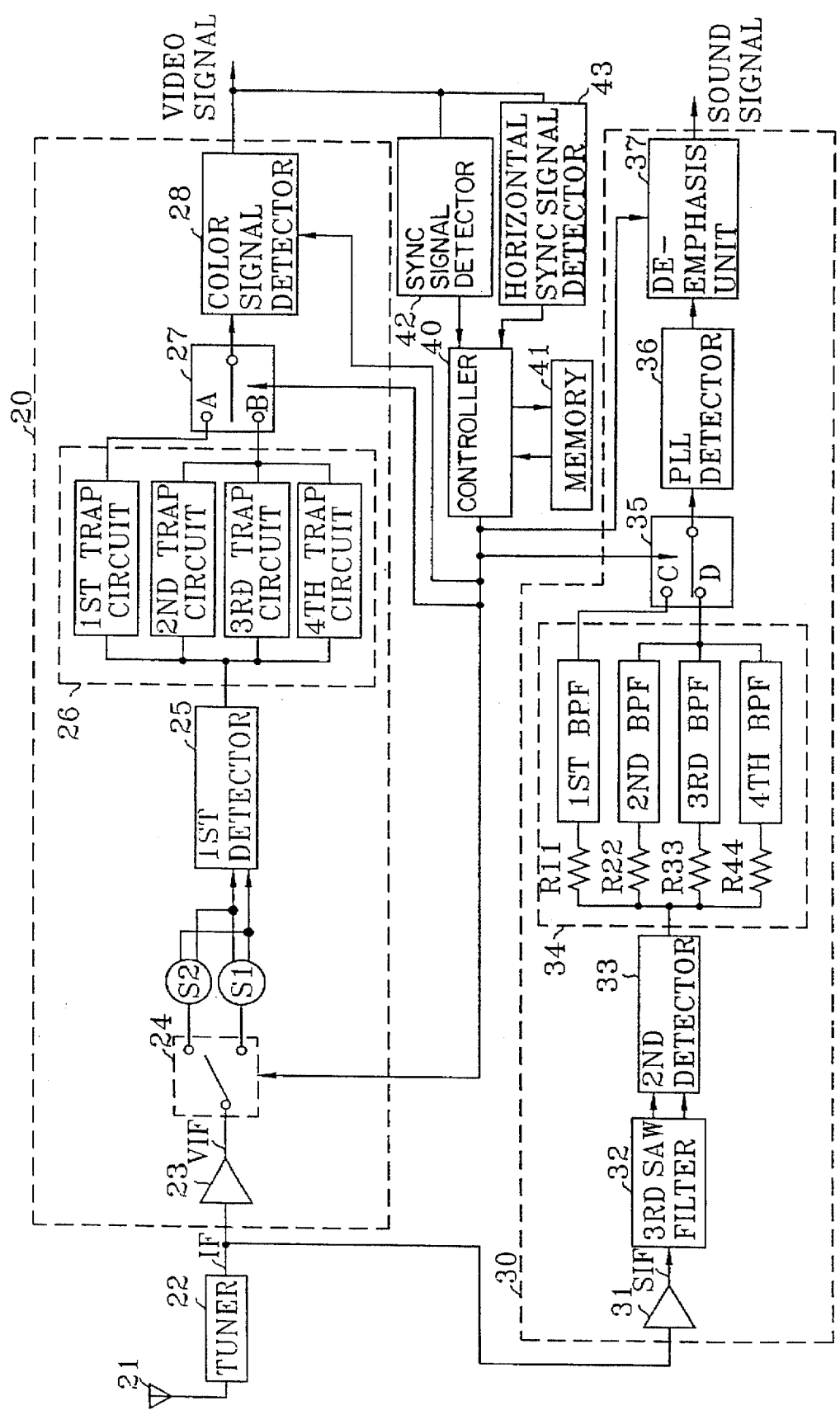
FIG. 4 is a block diagram showing a multi-broadcast channel selection apparatus according to the present invention.

FIG. 4 is a block diagram showing a multi-broadcast channel selection apparatus according to the present invention. The channel selection apparatus shown in FIG. 4 includes a tuner 22 for selecting a channel, a video signal processing circuit 20 and a sound signal processing circuit 30, both coupled to the output of tuner 22, for demodulating a video signal and a sound signal, respectively. As in the conventional apparatus, if channel signals are received via a receiving antenna 21, a channel signal selected by tuner 22 is shifted to a lower frequency and converted into an intermediate frequency IF signal.

Video signal processing circuit 20 and sound signal processing circuit 30 each includes an amplifier (23 and 31), one or more SAW filters (S1, S2 and 32) and a detector (25 and 33), respectively. Thus, the video and sound signals included in the IF signal are individually processed and both signals are exactly demodulated.

First, video signal processing circuit 20 includes a first amplifier 23. First amplifier 23 amplifies the input IF signal, as necessary, and outputs the amplified IF signal to a first switching unit 24. First switching unit 24 performs a switching operation according to a control signal supplied from a controller 40, to distinguish an NTSC signal from the other types of broadcast signals. The signal is applied to either a first SAW filter S1 which is adapted for the NTSC broadcast mode or a second SAW filter S2 which is adapted for the other broadcast modes, according to the position of first switching unit 24. A first detector 25 coupled to the outputs of the SAW filters S1 and S2, detects a filtered signal and outputs the detected signal to a trap unit 26.

Trap unit 26 includes first through fourth trap circuits for trapping a sound signal included in a video signal. The trap circuits trap signals having frequencies of 4.5 MHz, 5.5 MHz, 6.0 MHz and 6.5 MHz. First trap circuit is for trapping a 4.5 MHz signal, and is connected to a pole "A" of a second switching unit 27. The second through fourth trap circuits are commonly connected to the other pole "B" of the second switching unit 27. Second switching unit 27 selects one of the signals input to poles "A" and "B." Second switching unit 27 operates according to the control signal output from controller 40, and selects the signal input to pole "A" in the case of an NTSC signal and selects the other signals input to pole "B" in the case of the other broadcast modes.

A color signal detector 28 is coupled to the output of second switching unit 27, which detects a color signal from the video signal passing through trap unit 26. An operation of color signal detector 28 is described below, for the case when the "B" pole of switching unit 27 is selected. As can be seen from a detailed circuit diagram of color signal detector 28 shown in FIG. 5, color signal detector 28 receives the video signal via resistor R1 and detects a color signal according to an inductance of a coil L and a capacitance of a capacitor Ca. The detected color signal is calculated by the following equation (1).

$$f_c = \frac{1}{2\pi \sqrt{L \cdot C_a}} \tag{1}$$

The above equation (1) describes color detection when a signal according to one of the broadcast modes other than NTSC is received. When the color signal is detected transistor TR2 is turned on, thereby applying the power supply voltage Vcc to the output. If the NTSC broadcast is received, a NPN transistor TR1 is turned on by a control signal which causes the base of the transistor to be placed in a high state. In this case, the detected color signal is calculated as follows.

$$f_c = \frac{1}{2\pi \sqrt{L \cdot (C_a + C_b)}} \quad (2)$$

The above equation (2) describes the state in which capacitors Ca and Cb are connected in parallel to each other, by virtue of NPN transistor TR1 being turned on.

Meanwhile, sound signal processing circuit 30 includes a second amplifier 31. Second amplifier 31 amplifies the IF signal by a predetermined amplification factor and outputs the amplified signal to a third SAW filter 32. Third SAW filter 32 filters the amplified signal, where third SAW filter 32 has a M-shaped filter characteristic, as shown in FIG. 6A, which is different from that of first SAW filter S1 and second SAW filter S2 of first switching unit 24, as shown in FIGS. 6B and 6C, respectively. A second detector 33 coupled to the output of third SAW filter 32 detects the filtered signal and outputs the same to a band-pass-filter (BPF) unit 34.

BPF unit 34 band-pass-filters only a FM sound signal among the detected signal, and includes first through fourth BPFs for band-pass-filtering signals having frequencies of 4.5 MHz, 5.5 MHz, 6.0 MHz and 6.5 MHz, respectively. This is due to a fact that carriers of the sound signals, adapted for the respective broadcast modes, are different from each other. The BPFs receive the video signals detected by second detector 33 via resistors R11, R22, R33 and R44, respectively. First BPF for band-pass filtering a frequency of 4.5 MHz is connected to an input pole "C" of a third switching unit 35. The second through fourth BPFs are commonly connected to the other input pole "D" thereof. Third switching unit 35 coupled to the output of BPF unit 34 selects one of the input poles "C" and "D" according to a control signal supplied by controller 40. In case of an NTSC signal, the "C" input pole is selected, while in case of the other broadcast mode signals, the "D" input pole is selected. A phase-locked loop (PLL) detector 36 is coupled to the output of third switching unit 35. PLL detector removes a carrier from the sound signal and outputs an original sound signal to a de-emphasis unit 37. De-emphasis unit 37, shown in detail in FIG. 7, compensates a signal by compulsively emphasizing a high-band component of the signal received from the transmitter into its original level.

Figure 7:
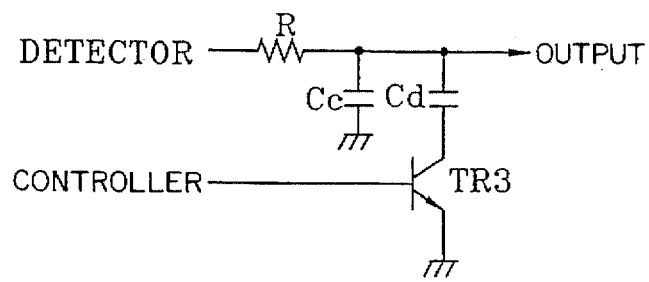
FIG. 7 is a detailed circuit diagram of a de-emphasis unit employed in the present invention.

FIG. 7 is a detailed circuit diagram of a de-emphasis unit 37 employed in the present invention. De-emphasis unit 37 receives a demodulated sound signal via a resistor R and performs an appropriate signal compensation operation according to a time constant $\tau_A$ represented by the product of resistor R and capacitors $C_c$ and $C_d$. For example, when an NTSC broadcast is received, a high state control signal is applied to the base of a NPN transistor TR3. Accordingly, if the NPN transistor TR3 is turned on, a cut-off frequency $f_{cut}$ of de-emphasis unit 37 is calculated as follows.

$$f_{cut} = \frac{1}{\tau_B} = \frac{1}{R(C_c + C_d)} \quad (3)$$

On the other hand, when other broadcast mode signals are received, NPN transistor TR3 is turned off, and time constant $\tau_A$ is determined only by resistor R and capacitor $C_c$. Accordingly cut-off frequency $f_{cut}$ is calculated as follows.

$$f_{cut} = \frac{1}{\tau_B} = \frac{1}{RC_c} \quad (4)$$

Video signal processing circuit 20 includes first and second switching units 24 and 27, while sound signal processing circuit 30 includes third switching unit 35. Controller 40 outputs a control signal to switching units 24, 27 and 35, respectively, to select the circuit connections according to a broadcast mode of the signal to be received. The main purpose for making such a selection of the circuit connections is to remarkably reduce the amount of signal distortion which is generated in the process of separating the video and sound signals, compared to the case of trap unit 26 or BPF unit 34 having a single output.

Controller 40 determines the broadcast mode of the received signal and controls switching units 24, 27 and 35, accordingly. That is, in FIG. 4, sync signal detector 42 and horizontal sync detector 43 are connected to the output of color signal detector 28. Controller 40 is connected to sync signal detector 42 and horizontal sync detector 43. If a certain broadcast channel is selected, sync signal detector 42 detects a sync signal from the video signal on the selected channel, and outputs the detected sync signal to controller 40. Controller 40 recognizes that the broadcast signal is received upon receiving the detected sync signal. Subsequently, horizontal sync signal detector 43 detects a horizontal sync signal having a frequency of either 50 Hz or 60 Hz, and outputs the detected horizontal sync signal to controller 40. For example, when the NTSC mode signal is selected, a 60 Hz horizontal sync signal is output, while when one of the other broadcast mode signals is selected, a 50 Hz horizontal sync signal is output. When controller 40 receives the 50 Hz or 60 Hz signal, the received signal is compared with the data stored in memory 41 to determine whether a high or low state control signal is to be output. The determined control signal is output to switching units 24, 27 and 35. That is, when a NTSC mode signal is selected, controller 40 outputs a first control signal, having for example a high state, to first through third switching units 24, 27 and 35, respectively. Then, the switching units perform a switching operation to exchange a circuit connection with one adapted for the NTSC mode.

Figure 8:
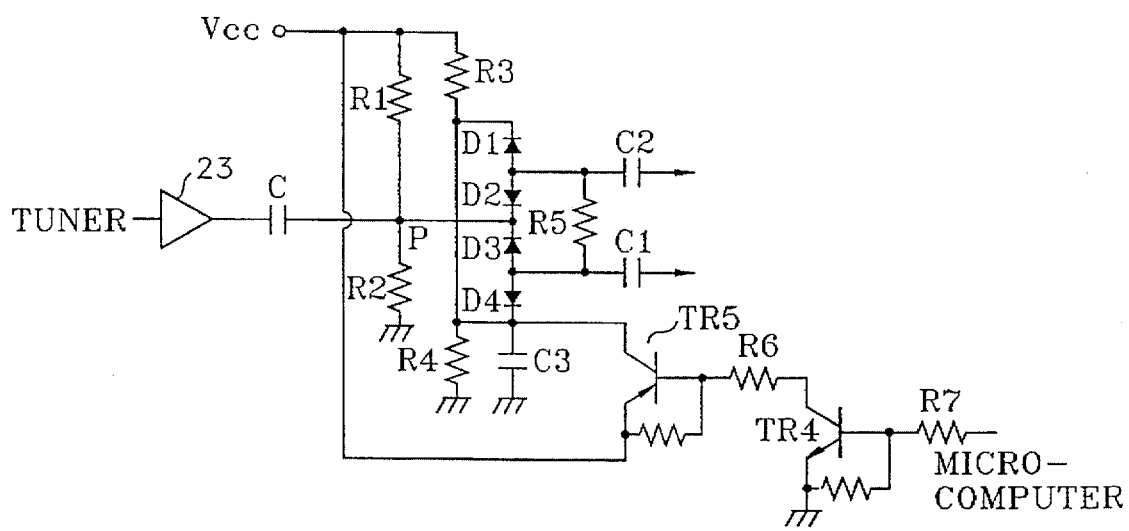
FIG. 8 is a detailed circuit diagram of a first switch unit employed in the present invention.

The switching operation of first switching unit 24 is described below. FIG. 8 is a detailed circuit diagram of first switching unit 24. In FIG. 8, first switching unit 24 is connected to first amplifier 23 via coupling capacitor C. The switching operation is performed according to the operation of a NPN transistor TR4, which has its emitter grounded and which receives a control signal from controller 40 via its base. As described above, if the first control signal having a high state, due to selecting the NTSC broadcast mode signal, is applied to the base of NPN transistor TR4, NPN transistor TR4 is turned on. Then, a PNP transistor TR5 is turned on, wherein PNP transistor TR5 has its base connected to the collector of NPN transistor TR4, its emitter connected to a power supply source Vcc, and its collector connected to diode D4 and resistor R4 and is coupled to ground via capacitor C3. Here, if the resistance values of resistors R1 and R2 for dividing power supply voltage Vcc are set to be the same, the potential of a point P shown in FIG. 8 becomes ½Vcc. Also, diodes D1 and D4, which receive power supply voltage Vcc via resistor R3, are turned on. Accordingly, the signal amplified by first amplifier 23 is applied to first SAW filter S1 via capacitor C1, in which the first SAW filter S1 is designed to be adapted for a NTSC mode signal. On the other hand, when the other broadcast mode signals, other than a NTSC mode signal, are selected, controller 40 outputs a second control signal having a low state to turn off NPN transistor TR4 and PNP transistor TR5. Here, if the resistance value of resistor R3 is set to be sufficiently larger than that of resistor R4, diodes D2 and D4 are turned on. Thus, the signal amplified by first amplifier 23 is applied to a second SAW filter S2 via capacitor C2, in which second SAW filter S2 is designed to be adapted for the other broadcast mode signals.

On the other hand, in FIG. 4, second switching unit 27 connects or disconnects an input pole "A", which is coupled to the output of the first trap circuit, or the other input pole "B", which is coupled to the second through fourth trap circuits. Second switching unit 27 can be realized simply by using an electronic relay (not shown). If the first control signal having a high state is input from controller 40, second switching unit 27 connects its output to the "A" input pole, while if the second control signal having a low state is input therefrom, it connects its output to the "B" input pole. The reason for separately connecting the "A" and "B" input poles to the output of switch unit 27 is to prevent signal distortion from being generated during the demodulation process, which is caused by the fact that a color signal component (4.43 MHz) necessary for selecting each of the other broadcast modes is trapped by the first trap circuit.

Meanwhile, third switching unit 35 can be realized by using an electronic relay as in second switching unit 27. Third switching unit 35 connects or disconnects its output to either an input pole "C" which is coupled to a first BPF, or to the other input pole "D" which is coupled to the second through fourth BPFs. If the first control signal having a high state is input from controller 40, third switching unit 35 connects the "C" input pole to its output, and if the second control signal having a low state is input therefrom, the "D" input pole is connected to its output. The reason for separately connecting the "C" and "D" input poles is to prevent the sound quality from being degenerated, due to the fact that a color signal component of 4.43 MHz is band-pass-filtered by the first BPF and is mixed with a sound signal of the other broadcast mode signals when one of the other broadcast mode signals is selected.

As described above, it can be seen that the switching operations of the respective switching units 24, 27 and 35 are controlled by the control signals from controller 40 to determine the switching connection states.

A process of determining the control signal to output is described below. First, controller 40 receives a horizontal sync signal of 50 Hz or 60 Hz from horizontal sync signal detector 43, and codifies the received signal to compare the coded signal with a coded signal pre-stored in memory 41. If the comparison indicates coincidence between the received horizontal sync signal and the prestored code, the circuit connection state is adapted for the desired broadcast mode, and accordingly, controller 40 outputs a control signal based on the input horizontal sync signal. If the comparison indicates a mismatch between the received horizontal sync signal and the pre-stored code, controller 40 outputs a control signal to memory 41 to change the code signal stored in memory 41, and then stores in memory 41 the code signal corresponding to the detected horizontal sync signal. That is, memory 41 stores information indicating the selected broadcast mode which is written and read by controller 40.

Figure 9:
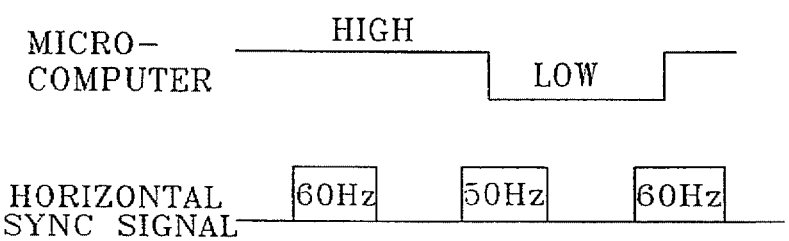
FIG. 9 shows timing relationships between a control signal of a controller employed in the present invention and a detected horizontal sync signal.

FIG. 9 shows a control signal output from controller 40 which is changed according to the detected horizontal sync signal. As shown in FIG. 9, the control signal output from controller 40 is either in the low or high state, based on whether the horizontal sync signal detected by horizontal sync signal detector 43 corresponds to a 50 Hz or 60 Hz signal, respectively. Accordingly, the state of the switch connections can be maintained and exchanged in order to be adapted to the broadcast mode of the received signal.

As described above, the present invention can select a desired broadcast mode without requiring any particular manipulation by a user, since a channel is selected by control of a tuner and then a controller automatically changes the state of the circuit connections. Also, a video signal processing path is separated from a sound signal processing path, and an amplifier and SAW filters designed to be adapted for the particularly selected broadcast mode, are used to thereby minimize signal distortion due to mutual interference. Further, since a PLL detector and a de-emphasis unit are used to demodulate a sound signal, sensitivity of the sound signal does not generate any difference according to the respective broadcast modes. Accordingly, excellent sound quality can be obtained even when a stereo broadcast is received.

Moreover, it is possible to automate a manufacturing process for the circuit, since a trap end block, normally required for selecting a NTSC mode signal and which is difficult to control, is not used. By not using a trap end block, lengthy inspection processes and corresponding high inferiority ratios are eliminated.

While only certain embodiments of the invention have been specifically described herein, it will apparent that numerous modifications may be made thereto without departing from the spirit and scope of the invention.

What is claimed is:

1. A multi-broadcast channel selection apparatus having a tuner for receiving a modulated signal broadcast according to a plurality of broadcast modes from a transmitter and converting the received modulated signal into an intermediate frequency (IF) signal having video and sound portions, wherein the video portion includes a sync signal, the multi-broadcast channel selection apparatus comprising:

a video signal processing circuit, coupled to an output of said tuner, for demodulating the video portion of the IF signal, and outputting a video signal adapted for each of the plurality of broadcast modes;

a sound signal processing circuit, coupled to said output of said tuner separately from said video signal processing circuit, for demodulating the sound portion of the IF signal, and outputting a sound signal adapted for each of the plurality of broadcast modes;

a sync signal detector, coupled to an output of said video signal processing circuit, for detecting the sync signal among of the video portion of the IF signal; and a controller, coupled to an output of said sync signal detector, for receiving the sync signal, determining the broadcast mode of the video signal output from said video signal processing circuit, and outputting a control signal to said video and sound signal processing circuits according to the determined result, wherein said video and sound signal processing circuits demodulate the IF signal based on the broadcast mode of the received modulated signal.

2. The multi-broadcast channel selection apparatus according to claim 1, wherein the plurality of broadcast modes includes NTSC, SECAM and PAL broadcast modes.

3. The multi-broadcast channel selection apparatus according to claim 1, wherein said sync signal detected by said sync signal detector is a horizontal sync signal.

4. The multi-broadcast channel selection apparatus according to claim 1, wherein said video signal processing circuit comprises:

a first amplifier for compensating for attenuation of the received signal converted by the tuner and outputting an amplified signal;

a first switch having an input terminal coupled to said first amplifier and first and second output terminals, for selectively connecting said input terminal to said first and second output terminals according to said control signal output from said controller;

a first filter connected to said first output terminal of said first switch, for filtering said amplified signal when said first switch selects said first output terminal, and outputting a first filtered signal;

a second filter connected to said second output terminal of said first switch, for filtering said amplified signal when said first switch selects said second output terminal, and outputting a second filtered signal;

a first detector, coupled to outputs of said first and second filters, for detecting the video signal within a predetermined frequency band among said first and second filtered signals;

a trap, coupled to said first detector, having at least two output terminals, for removing the sound portion from the detected video signal received from said first detector;

a second switch coupled to said trap and having first and second input terminals and an output terminal, for selectively connecting said output terminal of said second switch to said two input terminals according to said control signal output from said controller; and a color signal detector, coupled to said output terminal of said second switch, for detecting a color signal included in the detected video signal output from said trap.

5. The multi-broadcast channel selection apparatus according to claim 4, wherein said first and second filters are surface acoustic wave (SAW) filters.

6. The multi-broadcast channel selection apparatus according to claim 4, wherein said first switch comprises:

a first transistor having an emitter connected to a ground potential and a base connected to said controller, wherein said first transistor is turned on or off according to said control signal output from said controller;

a second transistor having an emitter connected to a power supply voltage and a based connected to said first transistor, wherein said second transistor is turned on or off according to the operation of said first transistor; and switching means coupled between said power supply voltage and a collector of said second transistor for selectively switching said amplified signal to said first filter when said second transistor is turned on and to said second filter when said second transistor is turned off.

7. The multi-broadcast channel selection apparatus according to claim 6, wherein said first transistor is an NPN transistor, and said second transistor is a PNP transistor.

8. The multi-broadcast channel selection apparatus according to claim 6, wherein said switching means comprises;

a voltage divider;

a first plurality of diodes connected between said power supply voltage and said voltage divider; and a second plurality of diodes connected between said voltage divider and said collector of said second transistor.

9. The multi-broadcast channel selection apparatus according to claim 4, wherein said trap comprises:

a first trap circuit for removing a first sound portion according to a NTSC broadcast mode; and second through fourth trap circuits for removing second through fourth sound portions according to other of the plurality of broadcast modes, respectively.

10. The multi-broadcast channel selection apparatus according to claim 9, wherein said first sound portion has a frequency of 4.5 MHz, and said second through fourth sound portions have frequencies of 5.5 MHz, 6.0 MHz, and 6.5 MHz, respectively.

11. The multi-broadcast channel selection apparatus according to claim 9, wherein said second switch selects an output of said first trap circuit when said control signal indicates the IF signal corresponds to the NTSC mode and selects the outputs of said second through fourth trap circuits when said control signal indicates the IF signal corresponds to one of the other of said plurality of broadcast modes.

12. The multi-broadcast channel selection apparatus according to claim 4, wherein said color signal detector comprises:

a coil which receives the video signal output from said trap;

a first transistor having a collector, an emitter connected to a ground potential, and a base which receives said control signal such that said first transistor turns on and off according to said control signal;

a second transistor having a collector connected to a power supply voltage, a base connected to said coil, and an emitter connected to an output terminal for outputting a detected color signal;

a first capacitor connected to said coil; and a second capacitor having one end connected to said base of said second transistor and another end connected to said collector of said first transistor, wherein the color signal is detected based on said coil and said first capacitor when said first transistor is turned off, and said coil and said first and second capacitors when said first transistor is turned on.

13. The multi-broadcast channel selection apparatus according to claim 12, wherein said first and second transistors are NPN type transistors.

14. The multi-broadcast channel selection apparatus according to claim 1, wherein said sound signal processing circuit comprises:

an amplifier for amplifying the IF signal output from the tuner by a predetermined amplification ratio, and outputting an amplified signal;

a filter, coupled to an output of said amplifier, for filtering said amplified signal and outputting a filtered signal;

a first detector for detecting said filtered signal, and detecting and outputting a detected video signal;

a band-pass-filter (BPF) unit, coupled to an output of said first detector and having two output stages, for band-pass-filtering only the sound signal from said detected video signal and outputting a signal from each of said two output stages;

a switch, coupled to said two output stages of said BPF unit for selectively outputting the signals output from the two output stages of said BPF unit to an output terminal according to said control signal;

a second detector, coupled to said output terminal of said switch for removing a carrier from said sound signal for detecting an original sound signal; and a de-emphasis unit, coupled to an output of said second detector, for compensating a high-band component of said original sound signal detected by said second detector by lowering a high-band component of said original sound signal to a predetermined level.

15. The multi-broadcast channel selection apparatus according to claim 14, wherein said filter is a surface acoustic wave (SAW) filter.

16. The multi-broadcast channel selection apparatus according to claim 14, wherein said filter has a M-shaped filter characteristic.

17. The multi-broadcast channel selection apparatus according to claim 14, wherein said sound signal is an FM sound signal.

18. The multi-broadcast channel selection apparatus according to claim 14, wherein said second detector is a phase locked loop (PLL) detector.

19. The multi-broadcast channel selection apparatus according to claim 14, wherein said BPF unit comprises:

a first BPF for band-pass-filtering a first sound signal of a signal broadcast according to one of the plurality of broadcast modes; and second through fourth BPFs for respectively band-pass-filtering second through fourth sound signals of signals broadcast according to other ones of the plurality of broadcast modes, respectively, wherein said first BPF outputs said first sound signal to a first output stage of said BPF unit and said second through fourth BPFs output the second through fourth sound signals, respectively, to a second output stage of said BPF unit.

20. The multi-broadcast channel selection apparatus according to claim 19, wherein said one of the plurality of broadcast modes is a NTSC broadcast mode and the sound signal according to which has a frequency of 4.5 MHz, and the sound signals of said other ones of the plurality of broadcast modes have frequencies of 5.5 MHz, 6.0 MHz, and 6.5 MHz.

21. The multi-broadcast channel selection apparatus according to claim 19, wherein said BPF unit further comprises first through fourth resistors each having one end connected to inputs of said first through fourth BPFs, respectively, and each having the other end connected to said output of said first detector.

22. The multi-broadcast channel selection apparatus according to claim 14, wherein said de-emphasis unit has a cut-off frequency, said de-emphasis unit comprising:

a resistor having an input terminal for receiving a detected sound signal output from said second detector and an output terminal;

a transistor having an emitter connected to a ground potential and a base which receives said control signal from said controller which turns said transistor on and off;

a first capacitor having one end connected to said output terminal of said resistor and another end connected to said ground potential; and a second capacitor having one end connected to said output terminal of said resistor and another end connected to a collector of said transistor, whereby the cut-off frequency is changed according to said control signal.

23. The multi-broadcast channel selection apparatus according to claim 22, wherein said transistor is an NPN type transistor.

* * * * *